United States Patent
Sim et al.

(10) Patent No.: US 8,524,833 B2
(45) Date of Patent: Sep. 3, 2013

(54) HIGH-EFFICIENCY LIGHT DIFFUSING POLYMERIC FILM AND MANUFACTURING METHOD THEREOF

(75) Inventors: Chang-Hoon Sim, Seoul (KR); Ki-Jeong Moon, Seoul (KR); Hae-Sang Jun, Seoul (KR)

(73) Assignee: Toray Advanced Materials Korea Inc., Gyeongsangbuk-Do (KR)

( * ) Notice: Subject to any disclaimer, the term of this patent is extended or adjusted under 35 U.S.C. 154(b) by 277 days.

(21) Appl. No.: 12/496,768

(22) Filed: Jul. 2, 2009

(65) Prior Publication Data

US 2010/0295001 A1    Nov. 25, 2010

(30) Foreign Application Priority Data

May 20, 2009  (KR) .................. 10-2009-0043955

(51) Int. Cl.
*C08L 63/02*    (2006.01)
*F21V 9/00*     (2006.01)

(52) U.S. Cl.
USPC ............ 525/107; 525/404; 428/327; 252/582

(58) Field of Classification Search
USPC .............. 252/582; 525/100, 132, 165, 187, 525/221, 228; 428/327
See application file for complete search history.

(56) References Cited

U.S. PATENT DOCUMENTS

| 4,415,509 A | * | 11/1983 | Toyooka et al. | 264/1.34 |
| 4,963,624 A | * | 10/1990 | Ida et al. | 525/309 |
| 5,607,764 A | * | 3/1997 | Konno et al. | 428/327 |
| 2004/0178986 A1 | * | 9/2004 | Kokeguchi | 345/107 |
| 2006/0246233 A1 | * | 11/2006 | Fukuda | 428/1.33 |
| 2007/0058250 A1 | * | 3/2007 | Muramatsu | 359/483 |
| 2007/0184212 A1 | | 8/2007 | Nimura et al. | 428/1.31 |

FOREIGN PATENT DOCUMENTS

| CN | 1366617 | 8/2002 |
| EP | 1197765 | 4/2002 |
| JP | S60-196956 | 10/1985 |
| JP | S60-223139 | 11/1985 |
| JP | 2001-194514 | 7/2001 |
| JP | 2007-249038 | 9/2007 |

OTHER PUBLICATIONS

Machine translation of JP 2001-194514.*
Office Action issued on Jul. 19, 2011 by the Japanese Patent Office (JPO) for Japanese Patent No. JP 2009-151273.
Office Action issued on Jun. 24, 2011 by the State Intellectual Property Office (SIPO) of the People's Republic of China for Chinese Application No. CN 2009101517353.
Barthelemy, et al. (2008) "A Lévy flight for light." Nature 453(7194):495-8 (PubMed Abstract Only).
Office Action issued on Feb. 6, 2012 by the European Patent Office (EPO) for European Patent Application No. 09 290 543.9.

* cited by examiner

*Primary Examiner* — Mike M Dollinger
(74) *Attorney, Agent, or Firm* — Harness, Dickey & Pierce, P.L.C.; Anthony G. Fussner; Kisuk Lee

(57) ABSTRACT

A high-efficiency light diffusing polymeric film comprises a first polymer which is a light transmissible medium, and a second polymer which forms light scattering particles, wherein the polymers are immiscible and have a refractive index difference of about 0.001 to about 0.5, and the polymeric film comprises about 30 about to 70 parts by weight of the second polymer with respect to 100 parts by weight of the first polymer. A method for manufacturing a high-efficiency polymeric film is carried out such that a first polymer forms a continuous phase and a second polymer forms a dispersed phase through coating or extrusion.

4 Claims, 2 Drawing Sheets

HIGH-EFFICIENCY LIGHT DIFFUSING POLYMERIC FILM AND MANUFACTURING METHOD THEREOF

CROSS-REFERENCE TO RELATED APPLICATION

This application claims the benefit and priority to Korean Patent Application No. 10-2009-0043955, filed May 20, 2009. The entire disclosure of the application identified in this paragraph is incorporated herein by reference.

FIELD

The present disclosure generally relates to a high-efficiency light diffusing polymeric film and a manufacturing method thereof, and more specifically, to a high-efficiency light diffusing polymeric film which helps ensure a high level of light transmittance and light diffusion compatibility, and a manufacturing method thereof comprising a relatively simple method, such as coating or extrusion.

BACKGROUND

This section provides information related to the present disclosure which is not necessarily prior art.

In general, light scattering phenomena involve interactions between light and materials. One example of this natural phenomenon is light scattering within homogeneous media, such as in clouds, milk, human cellular tissues, and particles. Light propagation properties are affected not only by the refractive index difference between a light transmissible medium (which can be used as an industrial material to implement light diffusion) and light scattering particles, but also by the cross-sectional morphology of the light scattering particles, such as the size and volume fraction of the light scattering particles. Consequently, light transmittance and light diffusion negatively affect each other. Based on this scientific fact, many attempts have been made to overcome the above-mentioned disadvantage; however, the inventors are not aware of any technique to produce a polymeric material which transmits and scatters light simultaneously and concertedly.

The widely known theories of light scattering which use cross-sectional morphology were posed by Rayleigh (1899) and Mie (1908). Rayleigh's theory applies when the size of light scattering particles is smaller than the wavelength of light. Mie's theory applies when the size of light scattering particles is larger than the wavelength of light. For light diffusion to occur without wavelength conversion, Mie's theory predicts that the size of light scattering particles must be larger than the wavelength of light. Accordingly, prior publications have commonly focused on optimizing the size and volume fraction of light scattering particles.

The first product which used light diffusion by controlling the internal structure of a light diffusing medium is believed to be a glass lighting apparatus. In 1933, Henry presented a theory based on experimental data which showed that it was possible to acquire 30 times more light diffusion intensity when the internal crystalline structure of the glass was adjusted instead of the surface roughness of glass. As a result, most panel lighting apparatuses today are manufactured in such a way that the internal crystalline structure of glass is adjusted during the cooling process.

Recently, selective light sources have been used to improve the efficiency of light transmittance and light diffusion. This is possible because of current light emitting display devices, such as liquid crystal displays (LCDs) and light emitting diodes (LEDs), which are themselves direct applications of polymeric films. For example, a plurality of polymeric films, such as light guide plates (LGPs), diffusion sheets, and prism sheets, can be configured together to form an LCD backlight unit.

Nowadays, there are many efforts to simplify such complex configurations. These simplifications are expected to become used widely. Such efforts include a method in which light diffusion efficiency is improved through higher light scattering with a lower particle volume fraction, a result achieved by increasing the refractive index between a polymeric light transmissible medium and light scattering particles. A commonly recognized problem is the deterioration of brightness, brightness uniformity, and hue uniformity caused by irregular dispersion of light scattering particles used to control cross-sectional morphology.

In another approach, Barthelemy et al. presented a theory in *Nature* (A Lévy Flight for Light, May 2008, *Nature*) describing that light sometimes diffused according to a 'Lévy flight'. Based on this theory, they propose that it is necessary to understand optical materials based on light diffusion behavior according to cross-sectional morphology in order to acquire uniform light diffusion efficiency, because light transmittance and light scattering depend upon the optical material's cross-sectional morphology and the refractive index difference of its constituent materials.

In another example, a large refractive index difference was used to successfully control the cross-sectional morphology of optical fibers; however, this is unrelated to the above-mentioned light emitting display devices. Furthermore, optical recording devices, light concentrator devices, or any optical device which intentionally triggers an optical nonlinearity or makes use of a nonlinearity, are unrelated to the examples described in the present disclosure.

Prior publications commonly rely only on the use of a large refractive index difference to devise light diffusion materials, though methods may vary. Through such methods, there have been a number of attempts to ensure simultaneous light transmittance and light scattering. However, no material which shows 90% or higher in both total light transmittance (transmittance of light from a straight path) and haze (an efficiency index of light diffusion by light scattering) has been reported yet.

Recently, a method has been reported in which a protrusion or a dent is made in relief or in intaglio on polymeric films or polymeric sheets to induce the concentration or diffusion of light. This method is used instead of adding light scattering particles into light transmissible media, signaling a departure from the methods mentioned above. The biggest problem with such methods is that it is impractical to maintain consistent light quality. For manufacture, a so-called imprint method is utilized, wherein a mold roll (the equipment to manufacture such films or sheets from polymer material) is embossed so that when the polymeric material is fed through the equipment, the polymeric material is molded into a polymeric film by ultraviolet (UV) radiation. Quality is limited by difficult separation of the polymeric film from the mold equipment after curing. If any additives are used to facilitate the separation, the desired level of quality may not be achieved. Equipment maintenance costs can soar when large-sized light emitting display devices are manufactured. More importantly, if such a new method were practiced, it may only satisfy the lowest of industrial requirements, for it is difficult to obtain compatibility between light transmittance and light diffusion, as addressed previously.

In addition, there has been an attempt to fundamentally overcome the above-mentioned drawbacks by inserting large amount of air bubbles into polymeric films. In this case, there is a big improvement in the maximum value of light transmittance from an existing level of about 45% to about 75% and the haze value has also increased to about 80% or higher. Therefore, it is expected that such polymeric films can be used in parts such as recent LED backlight units; however, this method is still limited by the previously reported partial wavelength conversion of white light caused by inconsistent air bubble generation. More importantly, heat resistance of the polymers problematically decreases after long-term light exposure. Actual quality control is limited because the boundaries between neighboring air bubbles may move because of high air bubble content within polymeric films.

As mentioned above, prior publications report a low level of compatibility, especially between simultaneous high light transmittance and light diffusion, which has various problems and limitations in practical stage in using polymers as optical materials. Therefore, the inventors have recognized a great need for improvement in polymeric films.

SUMMARY

This section provides a general summary of the disclosure, and is not a comprehensive disclosure of its full scope or of all its features.

The present disclosure is designed to provide a high-efficiency light diffusing polymeric film which provides a high level of light transmittance and light diffusion compatibility and a manufacturing method thereof, comprising a relatively simple method, such as coating or extrusion. These advantages of the present disclosure will be apparent from the following description, appended claims, and accompanying drawings.

The above advantages can be achieved by a high-efficiency light diffusing polymeric film comprising a first polymer, which is a light transmissible medium, and a second polymer, which forms light scattering particles, wherein the first and second polymers are immiscible and have a refractive index difference of about 0.001 to about 0.5, and wherein the polymeric film comprises about 30 to about 70 parts by weight of the second polymer with respect to 100 parts by weight of the first polymer.

Here, when a solution of the first and second polymers is evaporated to form a polymeric film, the polymeric film has a turbidity value of about 50 to about 200 NTU.

Preferably, the first and the second polymers do not physically mix and phase separate into a continuous phase and a dispersed phase, wherein the dispersed phase has a spherical shape or a substantially spherical shape.

In some embodiments, the first polymer and the second polymer comprise independently at least one selected from the group consisting of polymethyl methacrylate (PMMA), polystyrene (PS), polycarbonate (PC), polyester, phenoxy resin, acrylic resin, epoxy resin, and silicone resin.

In other embodiments, the polymeric film further comprises about 5 to about 95 parts by weight of energy beam-curable low molecular acrylate with respect to 100 parts by weight of the first and the second polymers. Without being bound by theory, this component is added to prevent additional phase separation of the dispersed phase or the continuous phase in the cross-sectional morphology formed by the first and the second polymers. The acrylate also stabilizes the cross-sectional morphology of the polymeric films.

This disclosure provides a method for manufacturing a high-efficiency light diffusing polymeric film, wherein the polymeric film is manufactured such that the first polymer forms a continuous phase and the second polymer forms a dispersed phase through coating or extrusion.

According to the present disclosure, the main approach comprises the phase separation phenomenon of at least one of a first and a second polymer that have a small refractive index difference and are immiscible. This approach ensures a high level of light scattering and light transmittance compatibility. For this purpose, cross-sectional morphology with a high volume fraction is adjusted, thereby making it possible to design a wide range of light diffusion properties with the required brightness and brightness uniformity. "Volume fraction" as used herein is the volume of a component in a mixture over the total volume of all components in a mixture. Volume fraction can be an alternative to mole fraction and is particularly useful for describing mixtures, such as polymer solutions, which can have a large disparity between sizes of the component molecules. Ideally, the total volume is the sum of individual volumes prior to mixing, but not necessarily so. Volume fraction can be calculated from the area fraction of particles in a total cross-sectional area.

In addition, according to the present disclosure, it is possible to manufacture polymeric films with the above light diffusion properties simply and easily through coating or extrusion. This method is very economic and guarantees high productivity. Especially, this method can be used to manufacture light emitting display devices of large size.

According to the present disclosure, the dispersed phase and continuous phase are adjusted by the addition of immiscible polymers, thereby making it possible to design various optical properties. For example, it is possible to convert ultraviolet rays into near infrared rays with a light concentrator film for solar batteries through the substitution reaction of a chromophore, which converts the wavelength on the surface of a dispersed second polymer.

BRIEF DESCRIPTION OF THE DRAWINGS

These and other features, aspects, and advantages of the present disclosure aid understanding with regard to the following description, appended claims, and accompanying drawings, in which like components are referred to by reference numerals. In the drawings:

DETAILED DESCRIPTION

Hereinafter, embodiments of the present disclosure will be described in detail with reference to the accompanying drawings. It should be understood that the detailed description of these embodiments are given by way of illustration only, and, accordingly, various changes and modifications within the scope of the disclosure will become apparent to those skilled in the art from this detailed description.

A high-efficiency light diffusing polymeric film of the present disclosure is a polymeric film comprising a mixture of at least a first and a second polymer that have a small refractive index difference and that are not thermodynamically miscible with each other. The present disclosure further comprises a method for forming a structure of a continuous phase and a dispersed phase respectively in cross-sectional morphology through phase separation and a method for manufacturing a polymeric film using the same.

According to the present disclosure, it is possible to ensure a high level of light transmittance and light diffusion compatibility through the method described above and to acquire a polymeric film through a relatively simple and easy method, such as coating or extrusion, by applying the abovementioned principle to the polymeric film. As a result, the present disclosure has an outstanding effect in principle or in economy compared with prior publications, such as a method in which different spherical particles with a large refractive index difference are inserted into a polymeric film, a method in which a protrusion is made in relief on the surface of polymeric films or sheets, and a technique in which multiple layers of polymeric films and sheets are stacked on each other to control the films' light diffusion properties. Therefore, this disclosure can be used not only to backlight units for LCD of a line light source, for a LED of a point light source, or an organic light emitting diode (OLED) of a surface light source, but also for diffusion films for solar batteries and for other various lighting apparatuses, which require a high level of light diffusion.

Light scattering phenomena involve the interactions between light and materials, such as the light scattering with the homogeneous media of clouds, milk, human cellular tissues, and particles. Based on these inventors' observations, a commercial material was designed by the inventors which provides uniform and high light diffusion by controlling light scattering. An important consideration commonly required for the design of polymeric light diffusing optical materials is to make light transmittance and light diffusion compatible in order to ensure the desired brightness.

Figure 1:
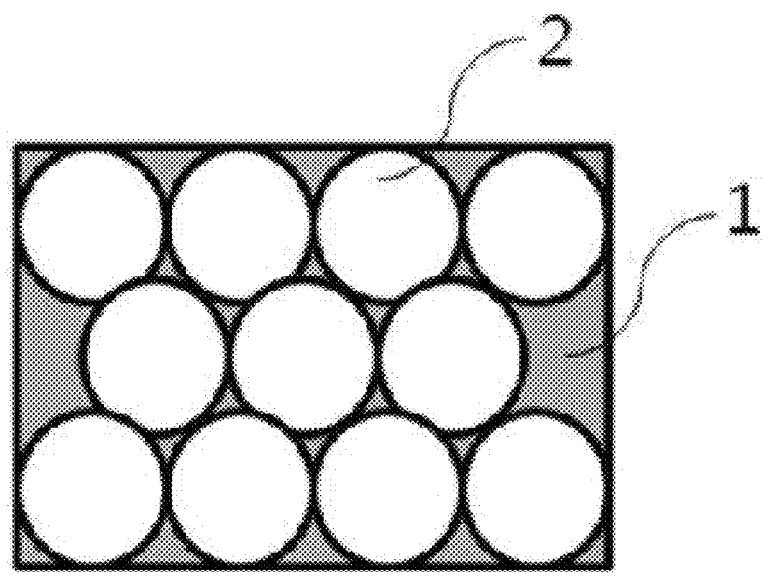
FIG. 1 is a conceptual diagram of cross-sectional morphology of the continuous phase of a first polymer and a spherical shape of the dispersed phase of a second polymer of the present disclosure, wherein 1 represents a continuous phase of the first polymer and 2 represents a spherical shape of the dispersed phase of the second polymer.
Figure 2:
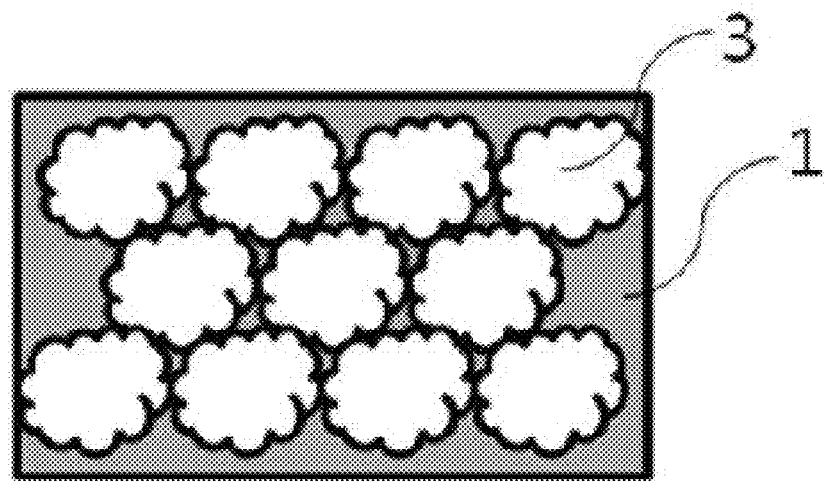
FIG. 2 is a conceptual diagram of cross-sectional morphology of the continuous phase of a first polymer and a substantially spherical shape of the dispersed phase of a second polymer of the present disclosure, wherein 1 represents a continuous phase of the first polymer and 3 represents substantially spherical shape of the dispersed phase of the second polymer.

Thus, a method was designed to ensure a high level of light transmittance and light diffusion compatibility. A rather high light transmittance and light diffusion can be acquired simultaneously when there is a small refractive index difference between a polymeric medium (in a continuous phase) and polymeric particles (in a dispersed phase). This method is distinct from prior art because the volume fraction of the polymeric particles is very high, as illustrated in the FIGS. 1 and 2. Based on this result, a new cross-sectional morphology of the polymeric material was designed to ensure compatibility between high light scattering and light transmittance without negative effect, and a novel approach was devised to form such cross-sectional morphology. In other words, even though a unit particle may have low light scattering from a small refractive index difference between a medium and the particles, the light scattering intensity increases greatly according to the Rayleigh equation:

$$I = I_0 \frac{\kappa^4 \beta^2}{2r^2}(1+\cos^2\theta) = I_0 \frac{8\pi^4 \beta^2}{\lambda^4 r^2}(1+\cos^2\theta), \beta = N\alpha^2,$$

where I is the scattering intensity, $\lambda$ is the wavelength of light, $\beta$ is the polarization index, N is the number of light scattering particles, and $\alpha$ is the polarization index.

The total number of light scattering particles (N) increases when such particles have cross-sectional morphology with a packed or dense structure due to the high volume fraction. In addition, light passing through an individual particle does not greatly decrease transmission because of the small refractive index difference, even if the light passes through multiple layers of packed particles. Increased light scattering intensity greatly improves light diffusion without diminishing total light transmittance. This effect is due to interfacial reflection between the medium and the particles, and the particles themselves interfacing more closely.

In addition, if there is a small refractive index difference between the medium and the particles as described above, the present disclosure shows success in designing the refractive index difference between the medium and the particles for both cases where the refractive index of the medium is higher than that of the particles, and where the refractive index of the particles is higher than that of the medium. In some embodiments, the refractive index difference between the medium and the particles is limited to an appropriate level.

The present disclosure makes use of the phase separation of immiscible or incompatible polymers with a small refractive index difference in order to implement a polymeric material having the cross-sectional morphology that ensures a high level of light transmittance and light scattering compatibility. That is, immiscible polymers phase separate into a continuous phase and a dispersed phase, according to their weights and the difference of thermodynamic free energy when the immiscible polymers are physically mixed or blended. Most polymers are immiscible with respect to each other, such as a polymer blend of PS (polystyrene) and PMMA (polymethyl methacrylate). Such an immiscible polymer blend comprises a dispersed phase of appropriate sizes by phase separation, thereby scattering light. This kind of phenomenon is used as a principle of measurement, such as dynamic light scattering (DLS) for examining the phase separation structure of an actual polymer blend.

The present disclosure may use as a first polymer without limitation any kind of transparent polymeric materials through which white light can pass, and act as a light transmissible medium. Such polymeric materials comprise polymers with high transmittance of visible rays, such as PMMA, PS, PC, polyester, etc. In addition, phenoxy resin, acrylic resin, epoxy resin or silicone resin may be used where heat resistance is required. In many embodiments, phenoxy resin is used for heat resistance. The present disclosure may use the same ingredients as the first polymer as a second polymer which acts as light scattering particles, without limitation.

However, the first polymer and the second polymer should have a structure that prevents the mixture therebetween. Without being bound by theory, the two polymers should have a mechanism that causes phase separation during the physical mixture. For example, PS and PMMA are the representative immiscible polymers. In addition, epoxy resin and acrylic resin, phenoxy resin and acrylic resin, epoxy resin and gum resin also do not mix with each other. Furthermore, most polymers and silicone resin make an immiscible polymeric blend.

Alternatively, the present disclosure may use a block copolymer as the first polymer or as the second polymer in order to implement the phase separation structure of cross-sectional morphology in various ways.

Next, in order to examine the immiscibility of the first and second polymers, the following method is used. First, a solvent which can dissolve the first and the second polymers is selected, and then the first and the second polymers are dissolved in the solvent. A glass sheet is coated with the solution and the solvent is evaporated, producing a film of predetermined thickness for measuring turbidity. If the solution produces a clear film after it is dried, then the two polymers are miscible polymers each other. If turbidity is high, then the two polymers are considered immiscible. The present disclosure uses a turbidity meter to measure the turbidity of the polymeric film in nephelometric turbidity units (NTU). Here, transparency is defined as 5-49 NTU, translucency is defined as 50-499 NTU, and opaqueness is defined as 500 NTU and greater.

In an embodiment, the turbidity appropriate for the immiscibility of the first and the second polymers for a high-efficiency light diffusing polymeric film is between about 50 and about 200 NTU. This range is selected because if the turbidity is lower than about 50 NTU, then it is almost impossible to scatter light, and if the turbidity is higher than about 200 NTU, it is very difficult to transmit light.

Moreover, the refractive indices for the first polymer (which corresponds to a continuous phase) and for the second polymer (which corresponds to a dispersed phase) are not limited to a particular value when designing the refractive index difference between the first polymer and the second polymer for the high-efficiency light diffusing polymeric film. For example, in some embodiments the refractive index difference is about 0.001 to about 0.5 between the first and second polymers, such as about 0.01 to about 0.1. The refractive index difference can be appropriately selected and designed by considering the mixture ratio of the first and second polymers by weight in order to compatibly acquire high light transmittance and light diffusion. If the refractive index difference is lower than about 0.001, then it is difficult to scatter light, and if the refractive index difference is higher than about 0.5, then it is not possible to increase the content of the dispersed phase in cross-sectional morphology due to light scattering effect because the refractive index difference is too large.

In addition, the present disclosure does not limit the shape or size of the dispersed phase in forming a continuous phase and a dispersed phase by physical mixture of the two different polymers. This is because the difference and effect of cross-sectional morphology based on the density of polymeric particles is more important. The shape and size of the dispersed phase can be freely changed without significantly affecting cross-sectional morphology.

Furthermore, the present disclosure may comprise a complete spherical shape for the dispersed phase formed by the second polymer, or it may comprise an irregular spherical shape of indefinite form. This is because different shapes can be formed depending upon the miscibility between the first and the second polymers, and the shape does not affect the compatibility of the light transmittance and light diffusion, which is main object of the present disclosure. As a factor governing the cross-sectional morphology, the volume fraction of the second polymer is important. Depending on the content of the second polymer, the cross-sectional morphology may be dense or be a structure in which particles maintain a certain spacing, thereby affecting optical properties. In some embodiments, the dispersed phase of the second polymer can have a spherical shape or a substantially spherical shape, though the size of the dispersed phase formed by the second polymer has no significant effect on the optical properties of the film. In some embodiments, the sphere has a diameter of about 0.5 to about 50 μm for the sphere, such as about 1 to about 10 μm.

Moreover, the polymeric films of the present disclosure may comprise about 30 to about 70 parts by weight of the second polymer, such as about 40 to about 60 parts by weight of the second polymer with respect to 100 parts by weight of the first polymer, in determining the mixing ratio between the first and the second polymers, for the mixing ratio which determines cross-sectional morphology. Especially, the mixing ratio is based on the miscibility difference through turbidity measurement and the refractive index difference between the two polymers.

Furthermore, any polymer can be mixed when there are two or more polymers. The polymers may have the same or similar characteristics as the first and second polymers described above. An additional third or fourth polymers can be provided to adjust the refractive index difference more finely. In some embodiments, the mixing ratio of the additional polymers is based on the method described above to adjust the film's general optical properties.

In addition, the present disclosure may use polymeric resins or low molecular weight acrylate derivatives, including energy beam-curable unsaturated acrylates, to stabilize the film's cross-sectional morphology. Importantly, the first polymer and the second polymer should be thermodynamically immiscible and the refractive index difference between the two polymers should be small. The mixing ratio of the energy beam-curable low molecular acrylate with respect to 100 parts by weight of the first and the second polymers is about 5 to about 95 parts by weight, such as about 10 to about 70 parts by weight, or more particularly about 30 to about 50 parts by weight.

Furthermore, the energy beam-curable acryl resin for forming a cross-linking structure to stabilize the cross-sectional morphology of the first and second polymers may comprise acrylic oligomers, acrylic monomers, acrylic polymers with double-bond, or any kind of energy beam-curable resins, without limitation. The energy beam-curable acrylic resin comprise at least one double-bond within its molecules, and for instance, low molecular weight compounds known from Japanese Patent Publication No. S60-196956 (1985) and No. S60-223139 (1985) are widely used. Such low molecular weight compounds include acrylate compounds such as trimethylol propane triacrylate, tetramethylol methane tetraacrylate, pentaerythritol triacrylate, and epoxy acrylate. Moreover, a photoinitiator may be used to trigger the curing of the energy beam-curable low molecular compounds. The photoinitiator may comprise, for example, benzophenone, acetophenone, dibenzyl, diacetyl, diphenyl sulfide, and azobisisobutyronitrile. The above photoinitiator is used typically about 0.5 to about 10 parts by weight, such as about 1 to about 5 parts by weight with respect to the total 100 parts by weight of the energy beam-curable low molecular compounds.

In addition, a polymeric film may be manufactured easily using the polymeric principle as described above in the present disclosure. The polymeric film can be easily mass produced through a widely used process, such as coating or extrusion. A polymeric film can be produced alone or as a coating on a transparent substrate, such as a thin film or glass. Here, the substrate can include, but is not limited to, conventional polyester films, acrylic sheets, and glass with electrodes. When the polymeric film is acquired alone or coated on a substrate, an appropriate thickness of the film is typically about 1 to about 500 μm, such as about 5 to about 100 μm, and more particularly about 10 to about 30 μm. If the thickness is less than about 1 μm, then the light scattering may decrease. If the thickness is larger than about 500 μm, then the outcome of coating may not be as desirable. If it is necessary to manufacture the polymeric film with a thickness of about 500 μm or thicker, a slot die can be used to coat or a sheet may be provided through extrusion. In some embodiments, it is possible to freely modify the design value of refractive index difference and the mixing ratio of the first and second polymers. The optical efficiency of the film is produced according to the required polymeric film thickness.

In some embodiments, a method for manufacturing a high-efficiency polymeric film is provided which comprises the polymeric film manufactured such that a first polymer forms a continuous phase and a second polymer forms a dispersed phase through coating or extrusion, wherein the first polymer is a light transmissible medium, and the second polymer forms light scattering particles, wherein the first and the second polymers are immiscible and have a refractive index difference of about 0.001 to about 0.5, and wherein the polymeric film comprises about 30 to about 70 parts by weight of the second polymer with respect to 100 parts by weight of the first polymer.

In other embodiments, when a solution of the first and the second polymers of the method is evaporated to form a polymeric film, the polymeric film has a turbidity value of about 50 to about 200 NTU.

In some embodiments, the first and the second polymers of the method do not physically mix and phase separate into a continuous phase and a dispersed phase, wherein the dispersed phase has a spherical shape or a substantially spherical shape.

In other embodiments, at least one of the first polymer and the second polymer used in the method is independently selected from the group consisting of polymethylmethacrylate (PMMA), polystyrene (PS), polycarbonate (PC), polyester, phenoxy resin, acrylic resin, epoxy resin, and silicone resin.

In yet other embodiments, the method further comprises about 5 to about 95 parts by weight of energy beam-curable low molecular acrylate with respect to 100 parts by weight of the first and the second polymers.

EXAMPLES

The following examples are merely illustrative, and do not limit this disclosure in any way.

Compositions 1, 2 and 3 were prepared based on the contents in the Table 1, and the optical properties of the Compositions were observed.

Composition 1: Phenoxy Resin Coating—One Component
Phenoxy resin: Toto Kasei Co., Ltd., YP-50
TDI: Soken Co., Ltd., toluene diisocyanate
Composition 2: Phenoxy Resin/Acrylate Resin Mixed Coating—Two Components
Acrylate resin: Soken Co., Ltd., SK-2147
Composition 3: Phenoxy Resin/Acrylate Resin/UV-Curable Acrylate Mixed Coating—Three Components
UV-curable acrylate: Aldrich, dipentaerithritol hexaacrylate (DPHA)
Acetophenone: Saitek Co., Ltd., IR-18

TABLE 1

|  | Refractive index (n) | Composition 1 | Composition 2 | Composition 3 |
|---|---|---|---|---|
| Phenoxy resin | 1.50 | 10.5 | 10.5 | 10.5 |
| Dipentaerithritol hexaacrylate (DPHA) | 1.49 | — | — | 5.0 |
| Poly (ethyl acrylate-co-butyl acrylate) | 1.51 | — | 1.6 | 5.5 |
| Toluene diisocyanate (TDI) | 1.56 | 0.1 | 0.1 | 0.1 |
| Acetophenone | 1.53 | — | — | 0.5 |

TABLE 1-continued

|  | Refractive index (n) | Composition 1 | Composition 2 | Composition 3 |
|---|---|---|---|---|
| Methylethylketone (MEK) | 1.37 | 19.5 | 25.9 | 41.5 |
| Phenoxy resin/Acryl scatter ratio | — | 65/35 | 61/39 | 50/50 |

The above 'scatter ratio' means the 'mixing ratio', specifically the ratio of between the phenoxy resin and acryl components which causes light scattering.

The mixing components of the above Compositions 1, 2, and 3 were respectively put into methylethylketone (MEK) solvent to agitate for about three hours, and then the solution was coated onto a polyterephthalate film substrate having a thickness of about 135 μm. After that, the solvent was removed from the solution and the resulting film was dried at around 110° C. for about 3 minutes to obtain a coated layer of thickness of about 70 μm. For Composition 3, UV rays were radiated after the mixture of UV-curable low molecular acrylate in order to prevent the decay of the dispersed phase of acrylate.

Next, the turbidity (measured by a turbidity meter), transmittance, and haze (measured by the hazemeter by Nakamura Co., Ltd.), brightness and International Commission on Illumination (CIE) coordinates (measured by 2D color analyzer) of the coated layer having the coating components of the above Compositions 1, 2 and 3 thereon were measured, and the results are in the Table 2.

TABLE 2

| Category | Turbidity (NTU) | Total Light Transmittance (%) | Haze (%) | Brightness (cd/m$^2$) | Hue Uniformity CIE (xy) |
|---|---|---|---|---|---|
| Composition 1 | 15 | 94.68 | 12.63 | 3329 | 0.256/0.257 |
| Composition 2 | 70 | 89.93 | 87.89 | 4842 | 0.298/0.295 |
| Composition 3 | 120 | 92.88 | 98.61 | 5318 | 0.316/0.315 |

As can be seen in Table 2, the turbidity measurement shows that phenoxy resin and acrylate resin are thermodynamically immiscible. With this result, the optical properties show that the haze value increases greatly without significantly decreasing total light transmittance in Compositions 1 and 2. Moreover, the result shows excellent brightness.

As a result of the above embodiment, the high-efficiency light diffusing polymeric film of the present disclosure shows compatibility between light transmittance and light diffusion through phase separation of a mixture of a first and a second polymer with a small refractive index difference. Especially, Composition 3 shows very high values of about 92% and about 98% for the light transmittance and light diffusion, respectively.

Thus, the high-efficiency light diffusing polymeric films and polymeric sheets of the present disclosure have a high level of light transmittance and light diffusion at the same time due to the cross-sectional morphology which has a small refractive index difference between a continuous phase and a dispersed phase and a high volume fraction of the dispersed phase. Accordingly, the present disclosure can be effectively used in manufacturing backlight units for LCD of a line light source, LED of a point light source, OLED of a surface light source, films for solar batteries, and other various lighting apparatuses which need a high level of light diffusion.

The embodiment and claims of the present disclosure describes a first and a second polymer, which are immiscible; however, more than two different immiscible polymers are within the scope of the present disclosure. For example, a high-efficiency light diffusing polymeric film formed of three different immiscible polymers remains within the scope of the present disclosure if the three different immiscible polymers comprising a first, a second and a third polymer have a small refractive index difference of about 0.001 to about 0.5, and comprise about 30 to about 70 parts by weight of the second and the third polymers with respect to 100 parts by weight of the first polymer.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method for manufacturing a high-efficiency polymeric film comprising:
    mixing a first polymer comprising phenoxy resin which is a light transmissible medium, a second polymer comprising acrylic resin which forms light scattering particles, and dipentaerythritol hexaacrylate in a solvent,
    preparing a polymeric film by means of coating or extrusion such that the first polymer forms a continuous phase and the second polymer forms a dispersed phase,
    evaporating the solvent such that the polymeric film has a turbidity value of about 50 to about 200 Nephelometric Turbidity Units, and
    curing the polymeric film under irradiation of UV-ray to prevent additional phase separation of the dispersed phase or the continuous phase and to stabilize a cross-section morphology of the polymeric film,
    wherein the first and the second polymers are immiscible and have a refractive index difference of about 0.001 to about 0.5, and
    wherein the polymeric film comprises about 30 to about 70 parts by weight of the second polymer with respect to 100 parts by weight of the first polymer, and about 5 to about 95 parts by weight of dipentaerythritol hexaacrylate with respect to 100 parts by weight of the first and the second polymers.

2. The method of claim 1, wherein the first and the second polymers do not physically mix and phase separate into a continuous phase and a dispersed phase, wherein the dispersed phase has a spherical shape or a substantially spherical shape.

3. The method of claim 1, wherein the polymeric film further comprises about 0.5 to 10 parts by weight of a photoinitiator with respect to 100 parts by weight of the energy beam-curable low molecular weight acrylate.

4. A light diffusion polymeric film obtained by a method according to claim 1.

* * * * *